(12) United States Patent　(10) Patent No.:　US 7,523,115 B2
Schmidt et al.　(45) Date of Patent:　Apr. 21, 2009

(54) METHOD FOR FINDING OBJECTS

(75) Inventors: Günter Schmidt, Unterhaching (DE); Michael Alvers, München (DE)

(73) Assignee: Definiens AG, Munich (DE)

( * ) Notice: Subject to any disclaimer, the term of this patent is extended or adjusted under 35 U.S.C. 154(b) by 495 days.

(21) Appl. No.: 10/239,446

(22) PCT Filed: Mar. 20, 2001

(86) PCT No.: PCT/EP01/03189

§ 371 (c)(1),
(2), (4) Date: Jan. 21, 2003

(87) PCT Pub. No.: WO01/71577

PCT Pub. Date: Sep. 27, 2001

(65) Prior Publication Data

US 2005/0055362 A1　Mar. 10, 2005

(30) Foreign Application Priority Data

Mar. 22, 2000　(DE) ............................... 100 14 066

(51) Int. Cl.
*G06F 17/30*　(2006.01)
(52) U.S. Cl. ..................... 707/100; 707/5; 707/103 R
(58) Field of Classification Search ............... 707/1, 707/3, 5, 7, 9, 10, 100–102, 103 R–103 Z, 707/104.1
See application file for complete search history.

(56) References Cited

U.S. PATENT DOCUMENTS

| | | | | |
|---|---|---|---|---|
| 5,321,833 A | * | 6/1994 | Chang et al. ................... | 707/5 |
| 5,625,767 A | * | 4/1997 | Bartell et al. ................ | 345/440 |
| 5,819,258 A | * | 10/1998 | Vaithyanathan et al. ........ | 707/2 |
| 6,012,056 A | * | 1/2000 | Menlove ........................ | 707/5 |
| 6,121,969 A | * | 9/2000 | Jain et al. .................... | 715/850 |
| 6,229,606 B1 | | 5/2001 | Way et al. .................... | 356/364 |
| 6,233,571 B1 | * | 5/2001 | Egger et al. .................... | 707/2 |
| 6,353,817 B1 | * | 3/2002 | Jacobs et al. .................. | 706/50 |
| 6,446,068 B1 | * | 9/2002 | Kortge .......................... | 707/6 |
| 6,564,202 B1 | * | 5/2003 | Schuetze et al. ............... | 707/2 |
| 6,789,088 B1 | * | 9/2004 | Lee et al. ..................... | 707/100 |
| 6,912,505 B2 | * | 6/2005 | Linden et al. .................. | 705/14 |

(Continued)

FOREIGN PATENT DOCUMENTS

WO　　　9714226　　　4/1997

(Continued)

*Primary Examiner*—Cheryl Lewis
(74) *Attorney, Agent, or Firm*—Imperium Patent Works; Darien K. Wallace (57) ABSTRACT

What is disclosed is a computer-implemented method for finding objects which are based on data structures, the method comprising the following steps: announcing a selection of objects; generating and/or invalidating a characterization of one object or several objects of the selection, with characterization being effected by means of an item of characterization information; calculating weights of the objects of the selection and/or of objects located in a vicinity of the characterized objects based on the characterization information, weights already calculated, and/or weights already stored; and modifying the selection and continuing the method from the first step until objects to be found are contained in the selection, until the method is interrupted, or until a given or calculated number of method steps has been carried out, with the possibility of terminating or interrupting the method after any one of the preceding steps.

15 Claims, 7 Drawing Sheets

U.S. PATENT DOCUMENTS

| | | |
|---|---|---|
| 6,941,321 B2 * | 9/2005 | Schuetze et al. ........ 707/103 R |
| 2003/0004995 A1 * | 1/2003 | Novaes ...................... 707/513 |
| 2003/0005038 A1 * | 1/2003 | Codella et al. .............. 709/203 |
| 2003/0005053 A1 * | 1/2003 | Novaes ...................... 709/204 |
| 2003/0069873 A1 * | 4/2003 | Fox et al. ...................... 707/1 |

FOREIGN PATENT DOCUMENTS

WO 9825105 6/1998

* cited by examiner

METHOD FOR FINDING OBJECTS

The present patent application is a national stage application of International Application No. PCT/EP01/03189, filed on Mar. 20, 2001. This application claims the benefit from German Application No. 100 14 066.1, filed on Mar. 22, 2000, in Germany. The subject matter of these two patent documents is incorporated herein by reference.

The present invention relates to a computer-implemented method for finding objects, and in particular a method wherein a selection is supported by indications obtained from items of information which are introduced into the method by suitably generating or invalidating a characterization of objects already selected.

In the prior art, several searching methods are known which are used for locating particular objects.

On the one hand, there is a searching method which performs a search with the aid of entries and ranges of attribute values which may be linked through logical terms. One example for such a query is the expression "Query((hobby IS photography) AND (age <40))". As a result of such a query, all those objects are returned to which the condition in the query applies. Such a search is not applicable for merely vague quantities and frequently fails owing to orthographic errors, ambiguities and synonyms in search terms, such as "fotografieren=photographieren [taking photographs]=knipsen [shooting photographs]".

There furthermore are searching methods making use of a hierarchical Thesaurus, which is comparable to leafing through an index list of a book. The drawback of such a searching method is that apart from a rigidly predetermined index structure, a user is not guided towards a target. In addition, the user cannot interactively control or influence the searching method. One example for such a searching method is the file explorer in the "Windows" operating system by the company Microsoft.

Finally, there are evolutionary searching methods where the user is offered a great many objects. The user then evaluates one or several ones of the objects in accordance with similarity with a sought object, and with the aid of this information a new selection of objects is determined by using a genetic or evolutionary algorithm, which selection is then announced to the user. The process is terminated when the user recognizes the object sought by him among the offered number of objects. It is one drawback of this searching method that the selection of an amount of information to be offered is performed solely on the basis of similarities between objects. The searching method is performed in a probabilistic manner. This means that the user will find a sought object with a particular probability only. In addition it is not clear when a search is completed.

The present invention was achieved in order to remedy the above mentioned problems in the prior art.

Consequently, it is the object of the present invention to furnish a method for finding objects, whereby objects may be found reliably and simply.

More specifically, a computer-implemented method in accordance with the invention for finding objects which are based on data structures, comprises the following steps: (a) announcing a selection of objects; (b) generating and/or invalidating a characterization of one object or several objects of the selection, wherein characterization is effected by means of characterization information; (c) calculating weights of the objects of the selection and/or of objects in a vicinity of the characterized objects based on the characterization information, weights already calculated, and/or weights already stored; and (d) modifying the selection and continuing the method from step (a) until objects to be found are contained in the selection, until the method is interrupted, or until a given or calculated number of method steps has been carried out, wherein the method may be terminated or interrupted after any one of steps (a) to (d).

In accordance with the invention one obtains the effect that through generating and/or invalidating a characterization of one or several objects and selecting the objects, only particular objects and not all objects have to be taken into consideration in subsequent method steps, whereby an efficient memory utilization becomes possible which cannot be achieved with previous methods.

In addition, due to iterative repetition of the method steps, generating and/or invalidating a characterization and/or selection of the objects may be carried out in adaptation to a respective query and a search result already obtained, so that objects to be found may be found reliably and simply, whereby the drawbacks of the prior art are avoided.

In accordance with a development of the present invention, weights of the objects of the selection are also announced.

In accordance with another development of the present invention, the objects include texts, numerals, geometrical shapes, graphic representations, picture documents, video documents, audio documents, or parts or combinations of these.

In accordance with another development of the present invention, the weights are represented through a vector having a real-number value in an n-dimensional space.

In accordance with another development of the present invention, upon generating a characterization of an object, this object is associated with a point in an n-dimensional space, and upon invalidating a characterization of an object, the association of the object with this point is invalidated again.

In accordance with another development of the present invention, the weights of an object are labelled with the aid of color, texture, shape, acoustic signals, animation, graphical characterization, textual characterization, arrangement on a graphic user surface, or combinations of these.

In accordance with another development of the present invention, the weights of an object are determined through measurement of the distances from the characterized objects, through the properties of the latter, through the properties of objects on a respective path to the characterized objects, or through combinations of these.

In accordance with another development of the present invention, a prescription for a calculation of weights of an object depends on this object or on an object in a vicinity thereof.

In accordance with another development of the present invention, the objects are integrated into a hierarchical network of objects.

In accordance with another development of the present invention, in step (a) and/or step (d) the selection takes into consideration objects having a higher position in the hierarchy as well as a vicinity of these.

In accordance with another development of the present invention, in step (a) and/or step (d) the selection takes into consideration those objects and a vicinity thereof which result from a textually or graphically formulated query.

In accordance with another development of the present invention, in step (a) and/or (d) the selection takes into consideration those objects and a vicinity thereof which possess particular weights and/or properties based on stored information.

In accordance with another development of the present invention, the calculated weights and/or the characterized objects of a user or of a selection of users are stored, and this information is used for setting the weights at the outset of the method and/or for modifying the weights calculated in the course of the method.

In accordance with another development of the present invention, the calculated weights in the objects, through a measure of relevance, provide information on the extent to which a respective object pertains to at least one characterized object.

In accordance with another development of the present invention, the calculated weights in the objects, through a measure of relevance, provide information on the extent to which a respective object pertains to all characterized objects.

In accordance with another development of the present invention, modifying the selection in step (d) is performed with the aid of a corresponding hardware device.

In accordance with another development of the present invention, modifying the selection in step (d) is performed automatically with the aid of the calculated weights.

In accordance with another development of the present invention, in step (d) the selection takes into consideration those objects including a maximum relevance for a search and/or objects in a vicinity thereof, with a measure of relevance being calculated as a special form of a weight based on the other weights.

In accordance with another development of the present invention, in step (d) the selection corresponds to navigating in a quantity of all objects, with a new selection and an already existing selection jointly comprising one or several objects in a navigation.

In accordance with another development of the present invention, the objects are integrated into an $n^{th}$-order fractal-hierarchical network of objects, and properties of the links between objects influence the calculation of the weights in step (c) and/or the selection of the objects in step (a) and/or step (d).

The present invention shall hereinbelow be explained more closely by way of embodiments while making reference to the accompanying drawings, wherein.

Before giving a more detailed explanation of an embodiment of the present invention, it is noted that the present invention may advantageously be applied to a semantic or fractal network as described, for example, in the U.S. patent application Ser. No. 09/806,727 abandoned entitled, "Nth Order Fractal Network for Handling Complex Structures," filed on Mar. 30, 2001, with 371(c) date of Jul. 9, 2001, and the U.S. patent application Ser. No. 10/031,243 abandoned entitled, "Nth Order Semantic Network Allowing for Situation-Dependent Operation," filed on Oct. 18, 2001, with 371 (c) date of May 28, 2002.

It is noted, however, that the present invention is not restricted to use with a like network of objects. Rather, the present invention may be applied wherever objects exist which are based on data structures, and where a measure of a distance between objects can be defined.

The following is a description of an embodiment of the present invention.

FIGS. 1 to 7 show schematic views of first to seventh method steps in a method in accordance with the embodiment of the present invention.

Figure 1:
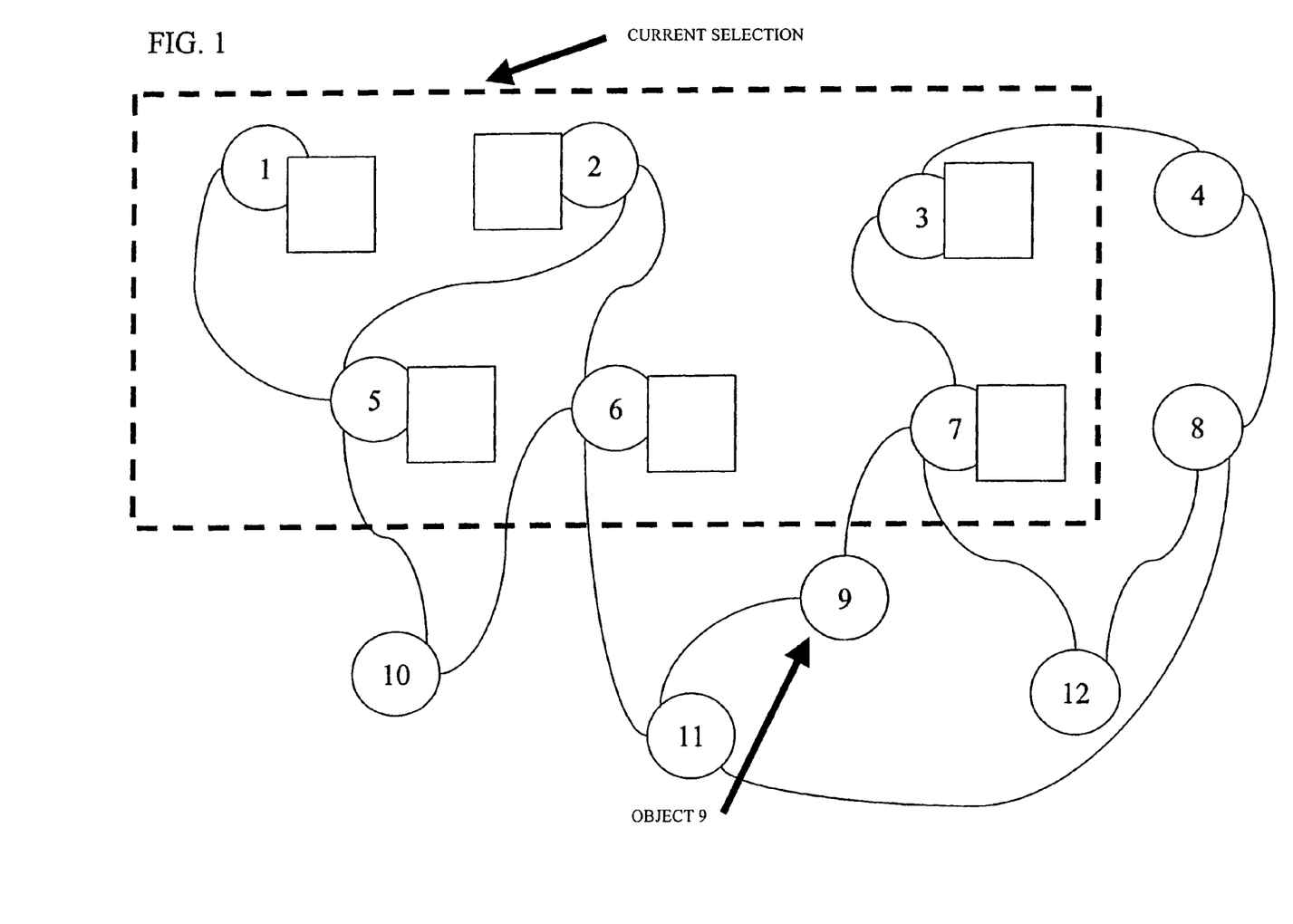
FIG. 1 is a schematic view of a first method step in a method in accordance with an embodiment of the present invention.

FIG. 1 is a representation of a network of objects including objects 1 through 12. To each one of these objects, an n-dimensional vector of numbers may be associated which represents weights in the searching method to be performed. As can be seen in FIG. 1, no weights have been allotted at the beginning of the searching method in this embodiment of the present invention. In a frame drawn as a dashed line in FIG. 1, a selection is entered which is selected at the outset of the searching method. Thus a selection of objects is announced in a first step of the searching method. In this embodiment of the present invention, object 9 is to be searched which, in terms of a query, is situated in the neighborhood or vicinity of objects 7 and 11, as is represented by the lines connecting objects 7 and 9 and objects 9 and 11 in FIG. 1. Object 9, on the other hand, is not located in the vicinity of object 10.

Figure 2:
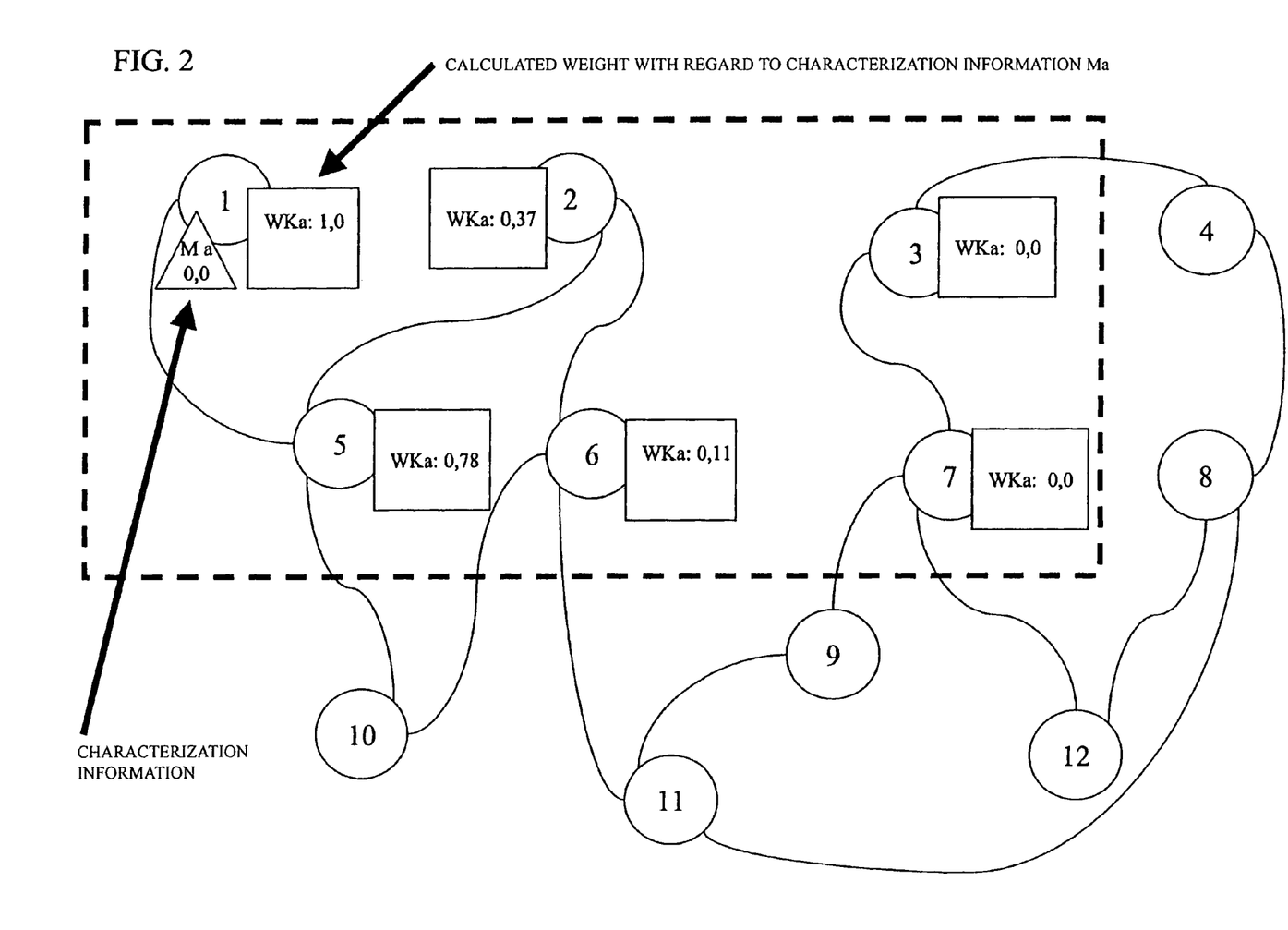
FIG. 2 is a schematic view of a second method step in the method in accordance with the embodiment of the present invention.

As is shown in FIG. 2, object 1 is now labelled by a user by generating a characterization and provided with characterization information Ma=0.0, as is shown in the triangular box of object 1 in FIG. 2. In other words, a second step is performed in which a characterization of an object or of a number of objects of the selection may be generated or invalidated. Characterization in this step is performed by means of an item of characterization information such as, for example, Ma, which is assigned a particular value indicating the degree of relevance an object characterized by this value has for a respective search.

As is shown in FIG. 2 in quadrangular boxes of objects 1, 2, 3, 5, 6 and 7, weights of the objects 1, 2, 3, 5, 6 and 7 are calculated for all objects 1, 2, 3, 5, 6 and 7 of the selection in a third step, such that a weight WKx of an object K behaves as a function of a distance DKL from a characterized object L having a characterization information Mx, as is expressed by the following equation (1):

$$WKx = \left| Mx - e^{-pa*DKL^{pb}} \right| \qquad (1)$$

with: pa=0.25 and pb=2.0

This equation (1) represents a Gaussian distribution. It is, of course, also possible to use any other form and/or parametrization of the dependency. In this embodiment of the present invention, values for WKa of 1.0, 0.37, 0.0, 0.78, 0.11 and 0.0, respectively result from the above equation (1) for the objects 1, 2, 3, 5, 6 and 7 contained in the selection. The higher the value of a weight WKx, the more relevant an object having this weight is with regard to the item of characterization information Mx for a respective search.

Figure 3:
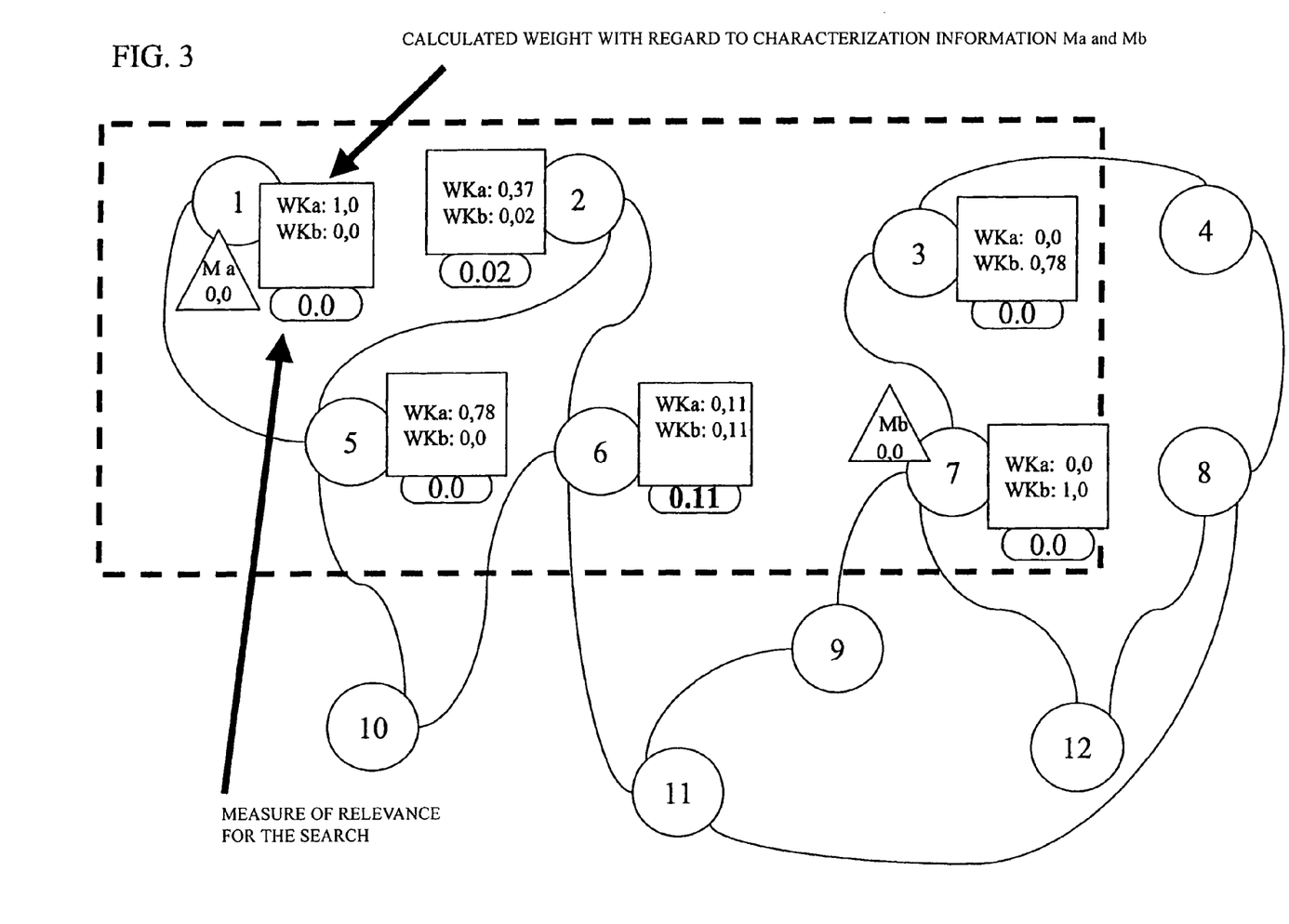
FIG. 3 is a schematic view of a third method step in the method in accordance with the embodiment of the present invention.

As is shown in FIG. 3, for an identical selection the object 7 is now, in the same manner as described before with regard to object 1, characterized by a characterization information Mb=0.0, and weights WKb of all objects 1, 2, 3, 5, 6 and 7 present in the selection are calculated anew. In this embodiment of the present invention, weights WKb of 0.0, 0.02, 0.78, 0.0, 0.11 and 1.0, respectively, result for the objects 1, 2, 3, 5, 6 and 7 contained in the selection. If objects are to be found which best match all characterized objects, then a measure of relevance may be defined as a special weight. This measure of relevance indicates information concerning a progress of search. The greater the value of a measure of relevance, the closer a respective object is situated to a searched object. A possible form of the definition of the measure of relevance of an object K is given in the following equation (2):

$$RK=\min(S-WKa, S-WKb, \ldots) \quad (2)$$

with $S=\mathrm{sum}(WKa, WKb, \ldots)$, wherein the minimization min and the summation sum covers all weights WKx of an object.

Figure 4:
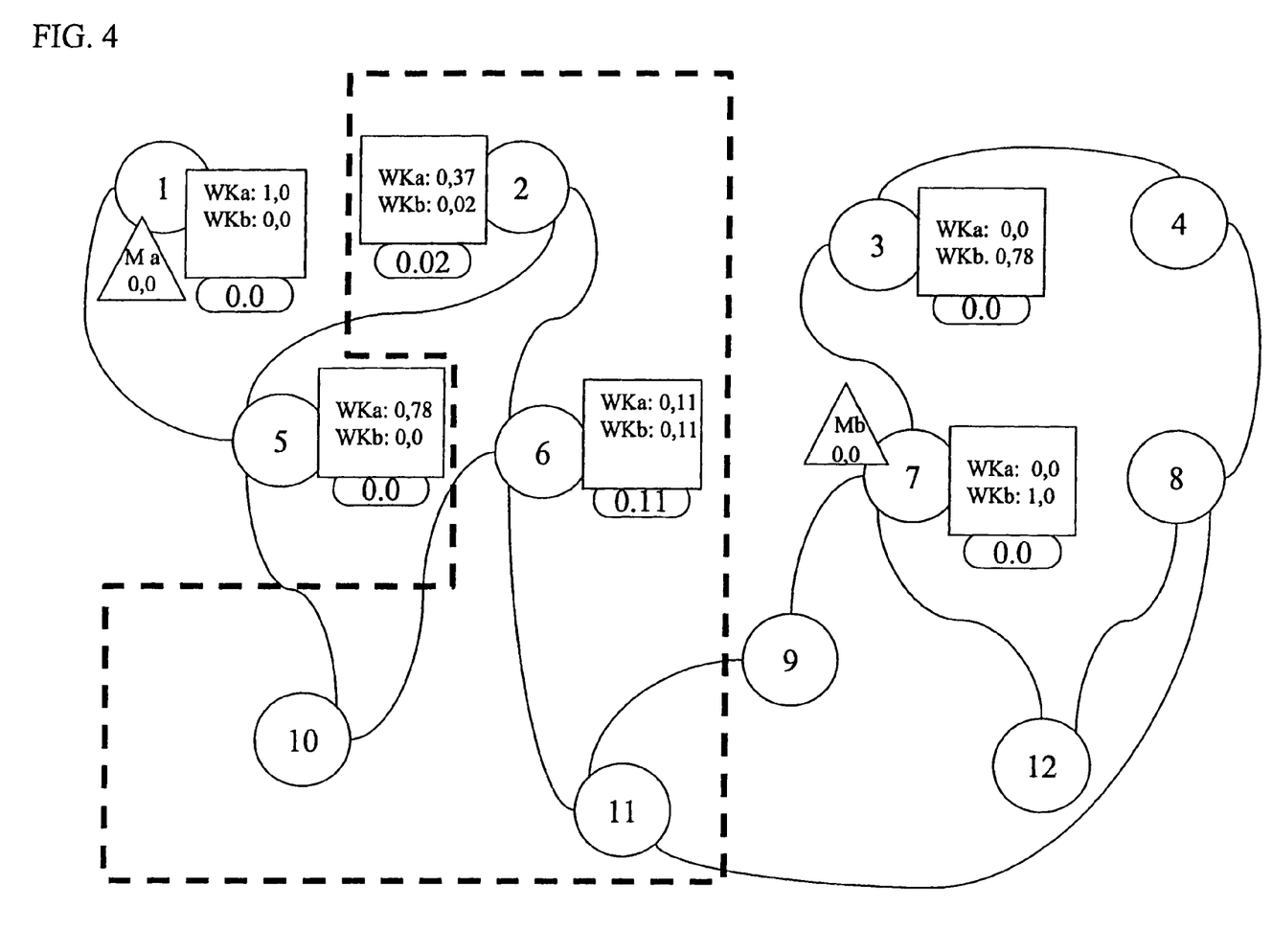
FIG. 4 is a schematic view of a fourth method step in the method in accordance with the embodiment of the present invention.

The measures of relevance calculated in this embodiment of the present invention with the aid of equation (2) for the objects 1, 2, 3, 5, 6 and 7 that are contained in the selection are indicated in the oval boxes of the respective objects 1, 2, 3, 5, 6 and 7 in FIG. 3. It is, however, also possible to use other dependencies in deriving a measure of relevance, which is possible in particular when weights already calculated in the past play a role in the searching method. As can be seen from FIG. 3, there results in this embodiment of the present invention a maximum measure of relevance R6=0.11 for object 6. If, now, as a new selection the vicinity around object 6 is selected, there results the selection which is shown in FIG. 4 and contains objects 2, 6, 10 and 11.

The expression "vicinity" as used here is closely linked with the expression "distance". All those objects having a measure of distance from a given object that is smaller than a predefined or calculated threshold, are considered to be neighbors of that given object. A determination of the measure of distance depends on the respective method used, which either is the same in the entire quantity of objects, or depends on single objects, or is the same in respective partial quantities of the quantity of objects and/or dependent on properties of the objects and/or on properties of relations between objects. In this embodiment of the present invention, the measure of distance between two objects is calculated from the minimum number of links having to be passed through in order to get from one object to another one. The vicinity around a given object is in this embodiment of the present invention defined as a quantity of objects having a measure of distance from a given object that is smaller than two. From this, there results for object 6 in FIG. 4 a vicinity of the quantity of objects 2, 10, 11 as the new selection as represented by the dashed frame in FIG. 4.

Figure 5:
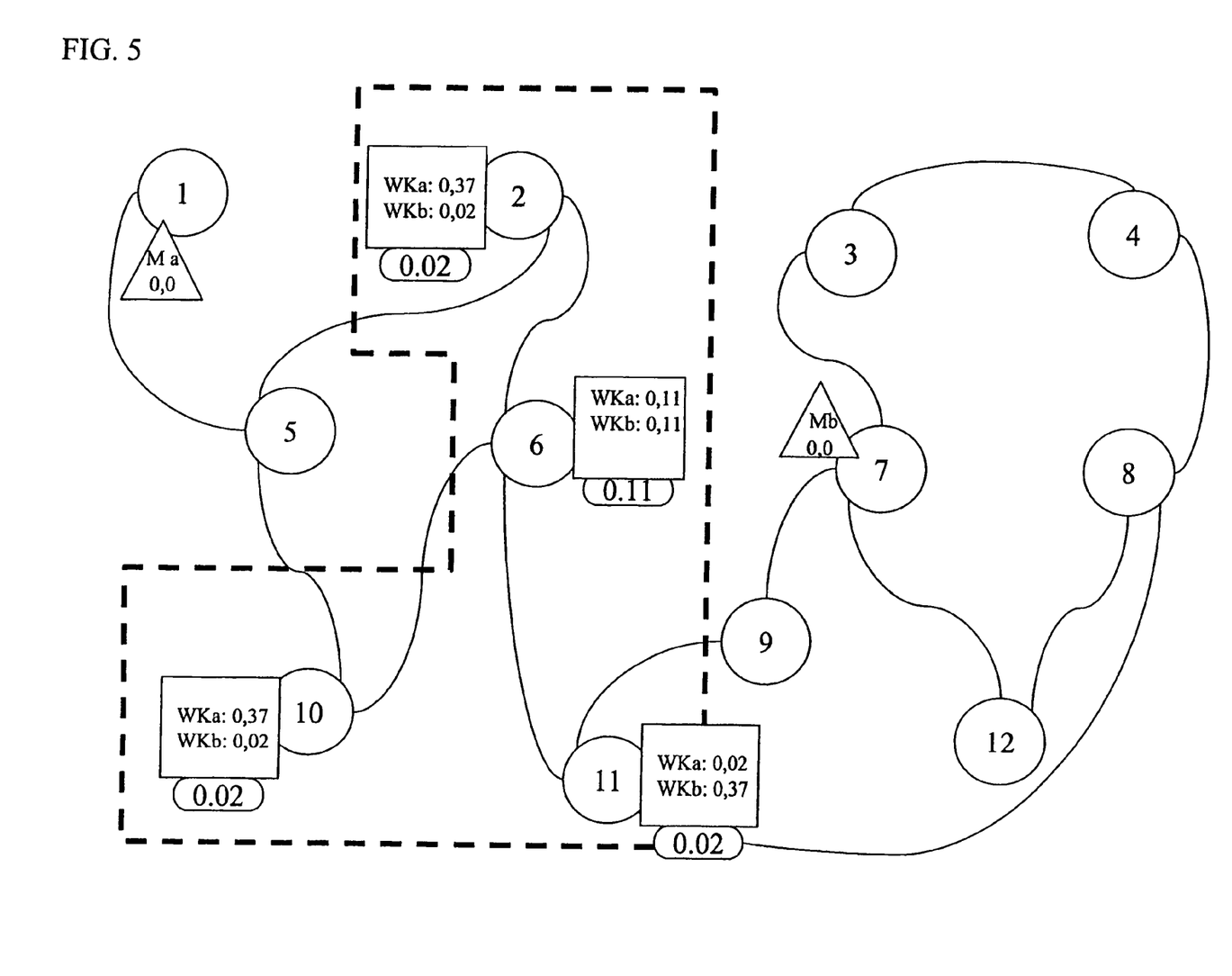
FIG. 5 is a schematic view of a fifth method step in the method in accordance with the embodiment of the present invention.

In accordance with the representation in FIG. 5, all weights WKa and WKb of the objects 2, 6, 10 and 11 present in the new selection and not already calculated are calculated anew, and all weights WKa and WKb already calculated of the objects 1, 3, 5 and 7 not contained any more in the new selection are discarded. If rapid calculation is to be ensured in view of constant modification of the selection, such as when navigating through the network of objects, it may be expedient to store all weights already calculated.

Figure 6:
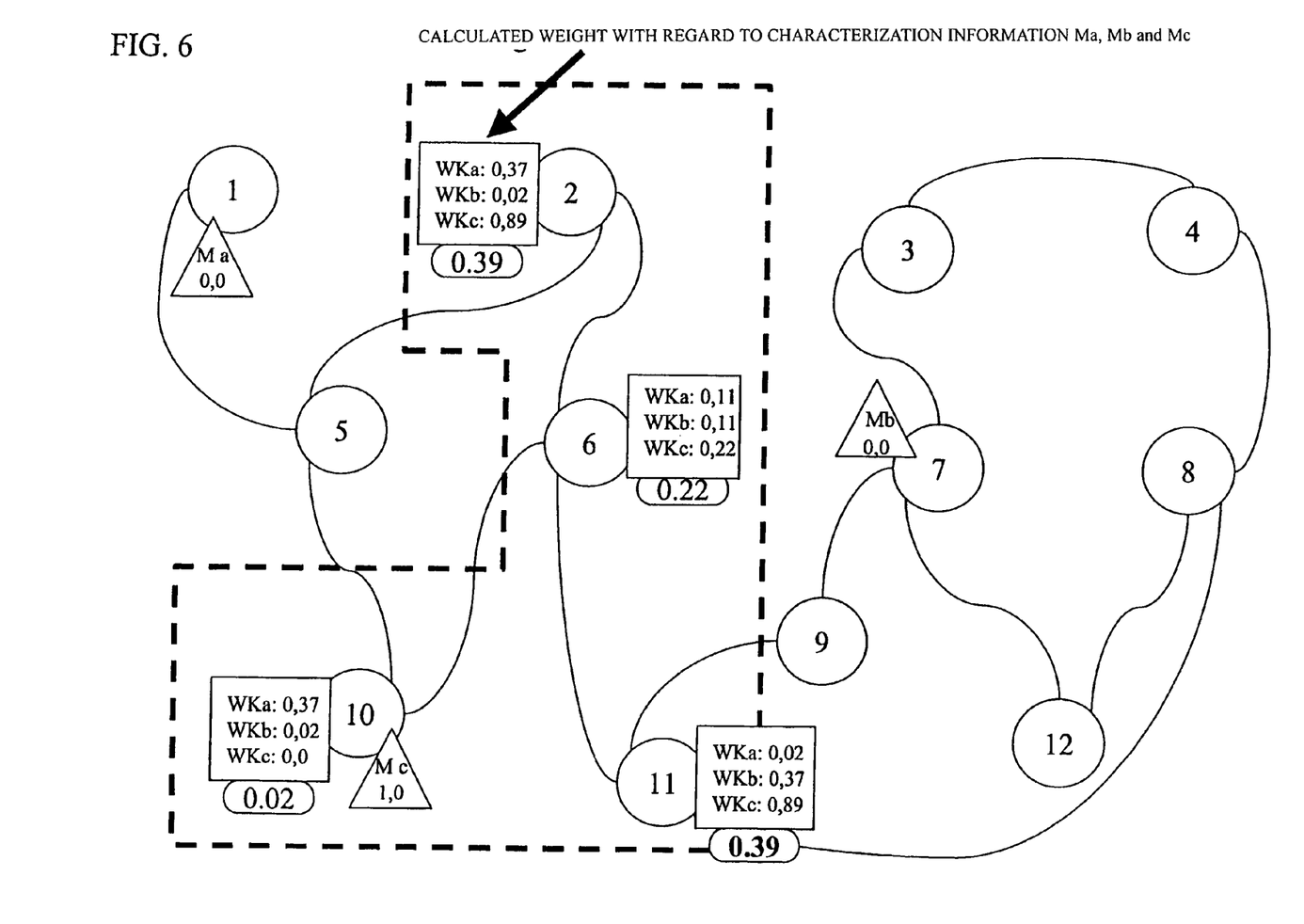
FIG. 6 is a schematic view of a sixth method step in the method in accordance with the embodiment of the present invention.

If now, for example, object 10 is considered to be entirely irrelevant for a respective search, then object 10 may be characterized through an item of characterization information of Mc=1.0 in accordance with the representation of FIG. 6. Weights WKa, WKb and WKc and measures of relevance R2, R6, R10 and R11 of objects 2, 6, 10 and 11 accordingly are calculated anew, as is shown in FIG. 6. As may be taken from FIG. 6, as a result object 11 having a maximum measure of relevance of R11=0.39 turns out to be the most relevant object of the present selection including objects 2, 6, 10 and 11.

Figure 7:
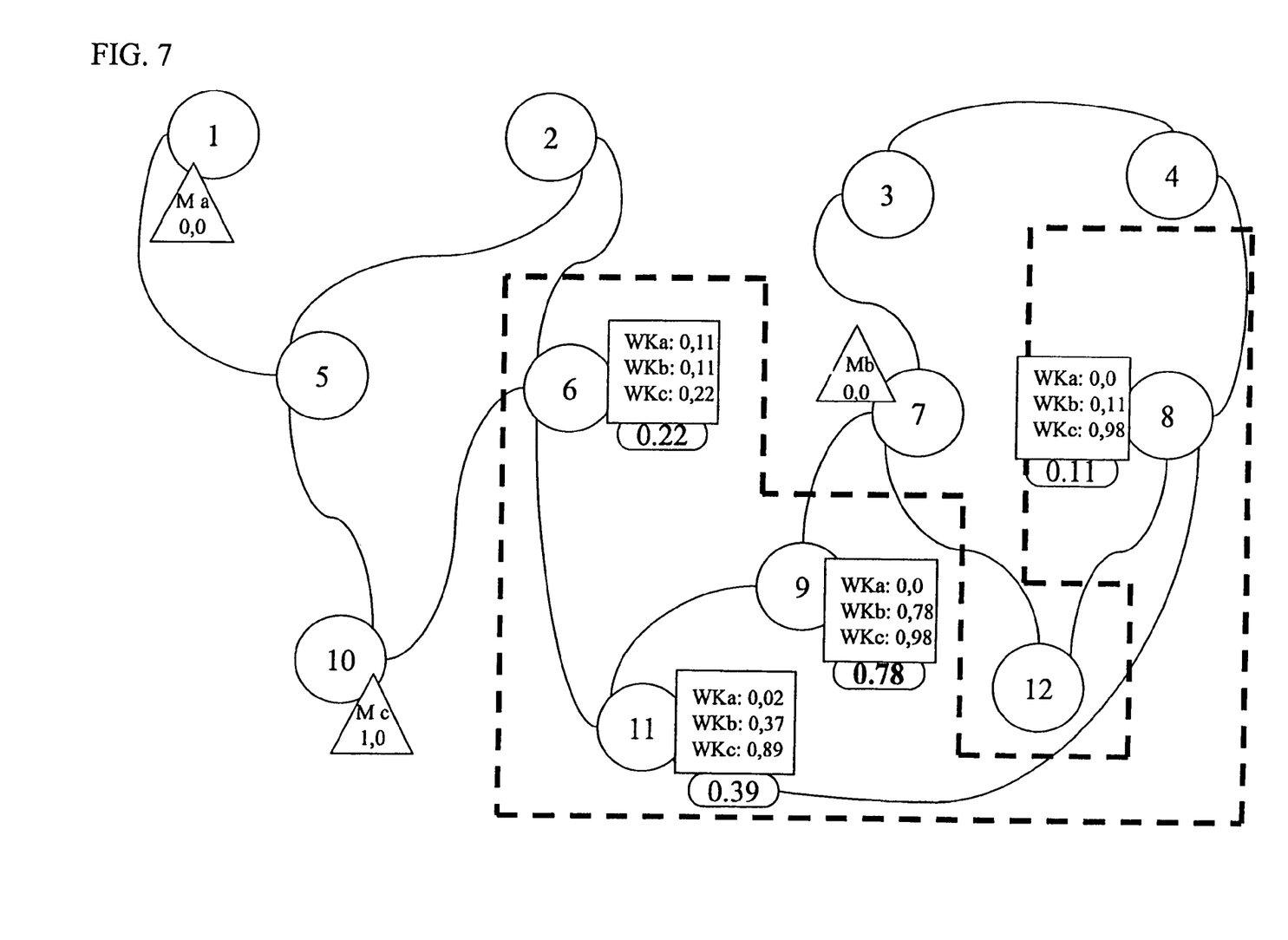
FIG. 7 is a schematic view of a seventh method step in the method in accordance with the embodiment of the present invention.

As is shown in FIG. 7, the selection is now modified such that object 11 having the maximum measure of relevance R11=0.39 and its neighboring objects 6, 8 and 9 are contained in the new selection. Following recalculation of the weights WKa, WKb and WKc and of the measures of relevance R6, R8, R9 and R11, object 9 is allocated measure of relevance R9=0.78 in this embodiment of the present invention. Because object 9 is the sought object, the sought object 9 was found in this embodiment of the present invention, and the method may be terminated.

The above described method may advantageously be applied in any cases in which merely a vague formulation may be given for a query and/or a search for an object requires information from the vicinity of this object or a context, respectively.

Concrete applications are any forms of database inquiries of complexly structured information such as, e.g., contents of text documents, audio documents or picture documents. Besides the text documents, audio documents or picture documents, the objects may also be texts, numerals, geometrical shapes, graphic representations or parts or combinations of all the above mentioned kinds.

In addition, by means of the above described method it is also possible to realize interactive "guidance" of customers towards products which the customers wish to purchase in e-commerce solutions, or the purposeful search for replies to customer's inquiries inside a given network of objects in help-desk applications.

Thanks to the above described method there moreover exists the possibility of replying to any formulated inquiries with expert systems. This is particularly possible in expert systems for problem diagnosis in medicine and technology. In a medical expert system, for example, patient data and symptoms associated with respective results may be depicted as an object in a network of objects. Through the above described method, it is very easy in a like network of objects to restrict the number of possible results by iterative characterization and new selection of objects.

Another application exists in the area of risk management and sensitivity analysis. In this case, it is possible to characterize objects representing risks. Based on this characterization and the above described method steps, it is then possible to obtain a selection of all those objects that are dependent on these risks.

In an analogously inverted method, all those objects are characterized the sensitivity of which is to be inspected with regard to risks. The above described method then iteratively finds a selection of risks acting on respective characterized objects.

The above described embodiment of the present invention merely constitutes one possible development of the method of the invention.

The present invention is, however, not restricted to this embodiment. Further possible developments of the method of the invention are described hereinbelow.

Although weights of objects of the selection are calculated in the above described embodiment of the present invention, there moreover is also the possibility of additionally or instead calculating weights of objects in the vicinity of the characterized objects based on the item of characterization information, weights already calculated, and/or weights already stored. The method may be continued until objects to be found are contained in the selection, the method is interrupted, or a given or calculated number of method steps has been performed. The method may herein be terminated or interrupted after any single method step.

In the above described embodiment, at the start of the method no weights are announced for the objects contained in a selection when the selection is announced. When announcing the selection it is, however, also possible to jointly announce weights of the objects contained in the selection.

The weights of the objects may, for example, be represented through a real-value vector in an n-dimensional space. Moreover the generation of a characterization of an object may be performed such that this object is associated with a point in an n-dimensional space. If the characterization is invalidated again, the association of this object with the point is invalidated again.

In general, the weights of the object may be labelled by means of color, texture, shape, acoustic signals, animation, graphical characterization, textual characterization, arrangement on a graphic user surface, or combinations of these.

Weights of the objects may, for example, be determined through measurement of the distances from characterized objects, through the properties of the latter, through the properties of objects on a respective path to the characterized objects, or through combinations of these. There moreover is the possibility of calculating the weights of an object depending on this object or on an object in a vicinity of the latter.

The method according to the invention may advantageously be applied to objects integrated into a hierarchical network of objects, with the equally existing possibility of the selection taking into consideration objects having a higher position in the hierarchy and a vicinity of these.

In the method of the invention, a query may, for example, be formulated textually or graphically. In such case, a respective selection takes into consideration those objects, as well as a vicinity thereof, which ensue as a result based on the query. There moreover exists the possibility of a respective selection taking into consideration those objects and a vicinity thereof, which possess particular weights and/or properties due to stored information.

Another advantageous development of the present invention consists in storing calculated weights and/or characterized objects of a user or of a selection of users and utilizing this information, in order to set weights at the start of the method and/or modify weights calculated in the course of the method.

Generally speaking, a user may be understood to be either a person, a group of persons, a software program or a suitable hardware device, wherein, for example, generating and/or invalidating a characterization and/or varying the selection may be carried out with the aid of a corresponding hardware device. There also is the possibility, however, of a selection being modified automatically by using calculated weights.

Calculated weights in the objects may, by way of the measure of relevance, provide information either about the degree of pertinence of a respective object to at least one characterized object, or information about the degree of relevance of a respective object for all characterized objects.

The selection may correspond to navigation in a quantity of all objects. When navigation is performed, a new selection and an already existing selection may have one or several objects in common.

The objects may finally be integrated into an $n^{th}$-order fractal-hierarchical network, and properties of links between objects may influence the calculation of weights and the selection of objects.

It accordingly is obvious that the present invention may be implemented in most variegated manners, so that the present invention should not be considered to be restricted to the above described embodiment.

The invention claimed is:

1. A method for finding a user-relevant object using data structures stored on a computer, said method comprising the following steps:

(a) selecting a selection of objects;

(b) generating a characterization of an object of said selection by associating said characterized object with a point in an n-dimensional space, wherein said characterization is effected by means of characterization information, and wherein said characterized object is taken from the group consisting of: a text, a numeral, a vector, a geometrical shape, a graphic representation, a picture document, a video document, and an audio document;

(c) calculating weights of said characterized object and of objects in a vicinity of said characterized object based on said characterization information, weights already calculated, or weights already stored, wherein a measure of relevance of said characterized object is determined using the weights of said characterized object and of the objects in the vicinity of said characterized object; and wherein said weights are represented through a vector having a real-number value in said n-dimensional space;

(d) modifying said selection by invalidating said characterization of said characterized object by disassociating said characterized object from said point in said n-dimensional space, wherein said measure of relevance is less than a predetermined minimum, and wherein the method is continued from step (a) until objects sought to be found by the user are contained in said selection, until the method is interrupted, or until a given or calculated number of method steps has been carried out, wherein the method may be terminated or interrupted after any one of steps (a) or (d).

2. The method of claim 1, wherein the objects represent products that a customer in an e-commerce application wishes to purchase.

3. The method of claim 1, wherein said objects are integrated into a hierarchical network of objects, wherein said characterized object represents a symptom of a patient, wherein said hierarchical network of objects represents possible symptoms of the patient, and wherein a medical expert system uses the method to diagnose a medical problem of the patient.

4. The method of one of the preceding claims, wherein the weights of an object are labeled with the aid of color, texture, shape, acoustic signals, animation, graphical characterization, textual characterization, arrangement on a graphic user surface, or combinations of these.

5. The method of one of the preceding claims, wherein the weights of an object are determined through measurement of the distances from said characterized objects.

6. The method of one of the preceding claims, wherein the calculating of the weights of an object depends on the object or on an object in the vicinity thereof.

7. The method of one of the preceding claims, wherein said objects are integrated into a hierarchical network of objects.

8. The method of one of the preceding claims, wherein in step (a) the selecting takes into consideration those objects and a vicinity thereof which result from a textually or graphically formulated query.

9. The method of claim 1, wherein in step (a) the selecting takes into consideration those objects and a vicinity thereof which possess particular weights based on stored information.

10. The method of one of the preceding claims, wherein the calculated weights and the characterized objects of the user are stored, and this information is used for setting the weights at the outset of the method.

11. The method of one of the preceding claims, wherein said measure of relevance of said characterized object provides information on the extent to which said characterized object pertains to an additional object in the vicinity.

12. The method of claim 1, wherein said measure of relevance of said characterized object provides information on the extent to which said characterized object pertains to all characterized objects.

13. The method of one of the preceding claims, wherein modifying said selection in step (d) is performed with the aid of a corresponding hardware device.

14. The method of one of the preceding claims, wherein in step (d) said selection corresponds to navigating in a quantity of all objects, with a new selection and an already existing selection jointly comprising one or several objects in a navigation.

15. The method of claim 1, wherein said objects are integrated into an nth-order fractal-hierarchical network of objects, and wherein properties of links between said objects influence said calculating of said weights in step (c).

* * * * *